Dec. 26, 1950 W. H. GRACE 2,535,408

MECHANICAL CHECK LIST

Filed Feb. 5, 1947 2 Sheets-Sheet 1

Inventor

William H. Grace

By Wooster & Davis

Attorneys

Dec. 26, 1950 W. H. GRACE 2,535,408

MECHANICAL CHECK LIST

Filed Feb. 5, 1947 2 Sheets-Sheet 2

Inventor
William H. Grace
By Wooster & Davis
Attorneys

Patented Dec. 26, 1950 2,535,408

UNITED STATES PATENT OFFICE

2,535,408

MECHANICAL CHECK LIST

William H. Grace, Stamford, Conn.

Application February 5, 1947, Serial No. 726,481

6 Claims. (Cl. 40—132.1)

1

This invention relates to a mechanical check list for checking off a number of different operations or features and providing a visual check for temporary record of items completed or accomplished.

It has for an object to provide a check list which can be used in transportation machines, such as airplanes, boats, trains, etc., for the purpose of indicating to the operator the correct order of starting, running and stopping such machines. It may also be used in buildings, hotels, and apartments to check and thus insure completion of janitorial and other duties, or which may be used in any other position where it is desirous to have a check on a series of items which are to be accomplished.

It has for its further object to provide a means for checking off a series of items and also to provide a means for unchecking them, for example, in case there should be a change in the condition of such items.

It has for a further object to provide a check list as heretofore described which can be either portable or stationary and which may be lighted for use by day or night.

With the foregoing and other objects in view, I have devised the construction illustrated in the accompanying drawing forming a part of this specification. It is, however, to be understood the invention it not limited to the specific details of construction and arrangement shown, but may embody various changes and modifications within the scope of the invention.

Figures 1, 2, 3, 4:
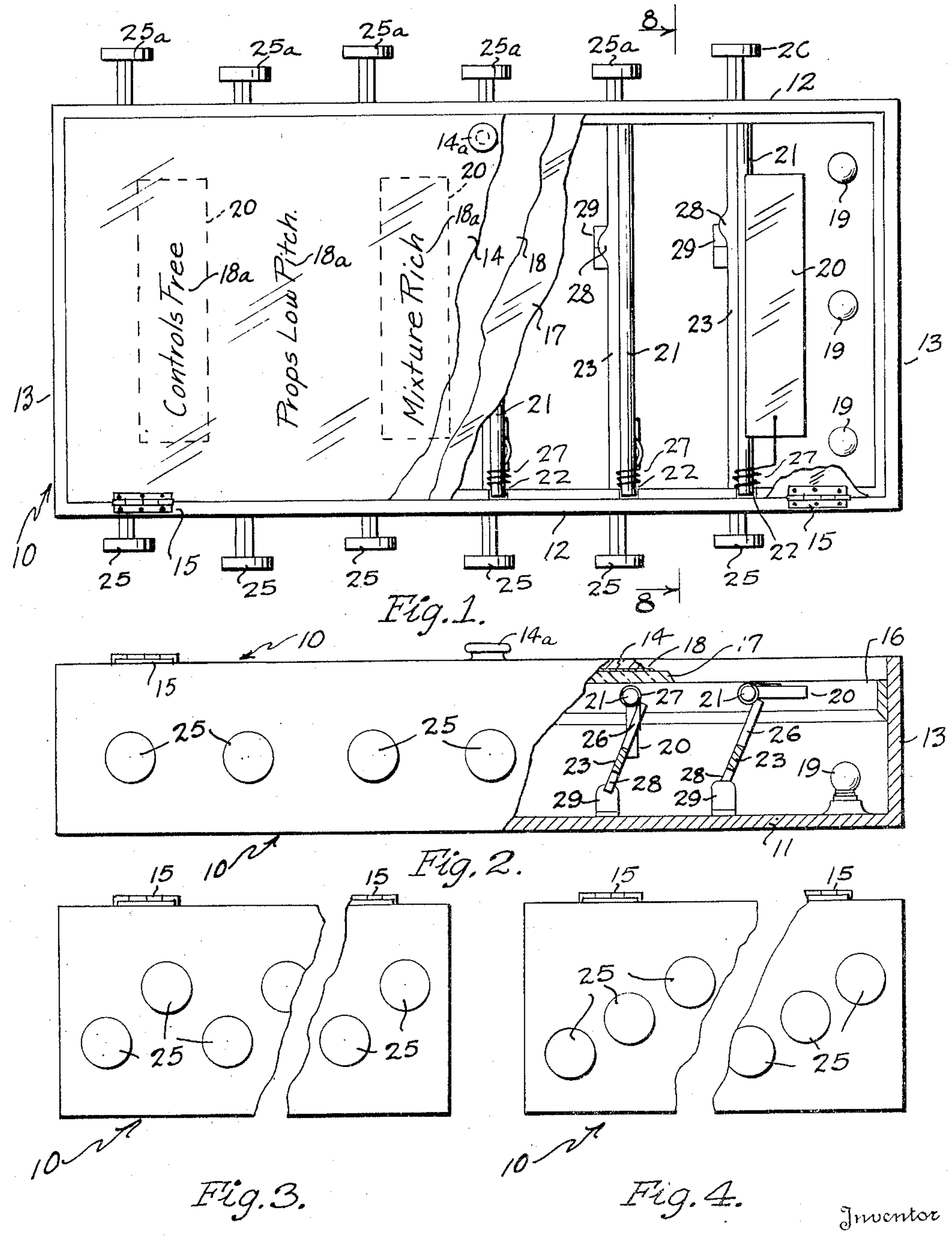
Fig. 1 is a top view of the device with portions broken away to show detail.
Fig. 2 is a view looking from the bottom of Fig. 1 with a portion sectioned to show detail.
Fig. 3 is a partial view showing a slight modification of the device.
Fig. 4 is a partial side view showing a further modification of the device.

The device comprises a suitable casing 10 comprising a substantially rectangular box with a bottom member 11, side members 12 and end members 13. The box is provided with a suitable transparent cover 14 composed of glass or other suitable material, the cover 14 being hinged to one of the sides 12, as at 15, and lifted or opened by any suitable handle 14*a*. The box 10 may be composed of wood, metal, plastic or other suitable material. Within the box 10 secured to the sides and ends around the interior of the box is a ridge 16 providing a narrow shelf to support an inner cover or support 17 which is composed of frosted glass or other suitable translucent material. The second cover 17 is in a position immediately beneath the hinged cover 14 and provides a support upon which a piece of paper 18 with a list of items 18*a* written or typewritten on it may be placed. The paper is sufficiently transparent that the typed or other notations on it are clearly visible by illumination from beneath it or within the box. The top cover 14 may then be placed over the typewritten paper 18 holding the typewritten paper 18 securely between covers 14 and 17. A series of lights 19 suitably located within the box 10 provide illumination whereby light will shine through the covers 14 and 17 and the paper 18, making the written or typewritten words on the paper easily readable.

2

Figures 5, 6, 7:
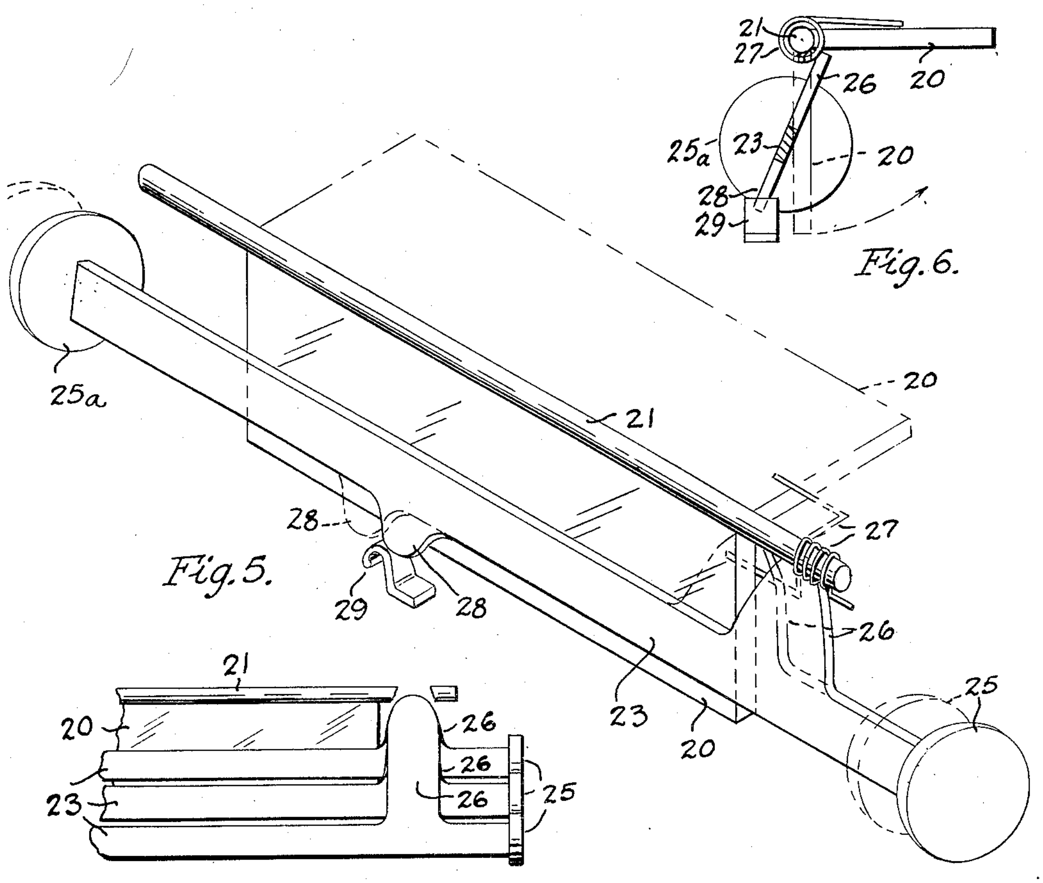
Fig. 5 is a perspective view showing the check-off operating means.
Fig. 6 is an end view of the check-off operating means shown in Fig. 5.
Fig. 7 is a partial view of the check-off operating means in the form of the device shown in Fig. 4.
Figure 8:
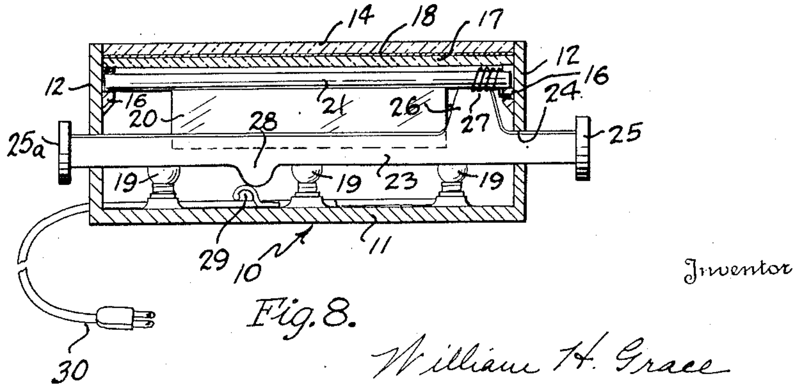
Fig. 8 is a section taken substantially on line 8—8, Fig. 1.

Means for checking off the items written on this paper 18 comprise a series of colored transparent or translucent strips 20, one for each of the items on the paper 18, the strips 20 being each secured to a shaft 21, the shaft 21 being supported at its ends in notches 22 in the shelf 16 on the sides 12, so that the colored strips 20 may easily be swung with the shaft 21 as a pivot. Associated with each strip 20 is a slidable rod or bar 23 which is supported by being inserted through suitable openings 24 in the sides 12 of the box 10. Each bar or rod 23 protrudes from the sides of the box and is provided with a hand knob 25 or 25*a* at either or both ends to provide a means for sliding the rod 23 back and forth. Projecting from the upper edge of the rod 23 is a cam or lug 26, the cam or lug 26 being rounded at its upper end, and the rod 23 being set in the sides 12 at a slight angle so that the top edge of the cam 26 will ride against the edge of the colored strip 20, causing the colored strip to swing about its pivot 21 into a horizontal position when the rod 23 is moved to the left, as shown in dotted lines, Fig. 5. A tension spring 27 around the strip supporting shaft 21 and anchored to the strip 20 and the recess 22 provides means for holding the colored strip 20 normally in the vertical position and thus provides a means for returning the strip 20 to the vertical position when the rod 23 is shifted to the right (see Fig. 5). A second cam or lug 28 protrudes from the lower edge of the rod 23 and, as illustrated in Fig. 5, when the rod 23 is to the right, the cam 28 is to the right of a small spring catch 29 secured to the bottom 11 of the box. The spring catch 29 protrudes far enough from the bottom 11 of the box to engage the lug 28 and yield when the rod 23 is shifted to the left, thus providing a definite snap to catch or lock when the rod 23 is shifted back and forth from left to right to thus give a definite click or feel to the operation of the rod.

It is clear that any desirable number of these colored strips 20 may be provided. However, when a large number are used, their operating rods 23 may be arranged in tiers, as shown in Figs. 3 and 4, to permit use of more of them in a given space and provide a sufficient space for each, so that the operator will not be liable to push more than one button at a time when he is wearing gloves, for example, or when his hands are cold. The only modification necessary is to put the hand buttons 25 on different levels in a box 10 with higher sides 12, and to increase the height of the cam 26 so that its upper edge will engage the colored strips 21, as shown in Fig. 7.

The source of power for the lights 19 heretofore described may comprise batteries (not shown) or it may be plugged into any suitable outlet by means of a cord extension and plug 30. Thus it is clear, to operate the device the top cover 14 is raised and a strip of paper with items written, printed, or typewritten thereon is placed over the second cover 17. The cover 14 is then placed down over the paper 18 and the device is ready for use. Let us assume, for example, that the operator is a pilot of an airplane. The items listed on the paper 18 give such information as is necessary for the pilot to check for the take-off. The pilot then, by glancing at the device, can readily see when he gets into a ship, that none of the items listed on the paper 18 have been checked. This information is conveyed to him by the fact that all of the colored strips 20 are in a vertical position, and thus the typewritten information can be seen without the colored strips 20 covering the items. Then, as he completes the pre-take-off check of his airplane, for example, as he adjusts the mixture for take-off, he pushes in the hand button 25 beneath the corresponding item on the list 18, causing the corresponding colored strip 20 to be shifted to a horizontal position beneath the item. The colored strip may, for example, be green, indicating to the pilot "O. K." It is to be understood, however, that the item checked is still readable as the colored strip 20 is translucent to permit the passage of light through it. The pilot then proceeds to check off, in a like manner, all the other items on the list. Now, should the pilot get word from the control tower to wait a minute or two as there is another plane coming in, and the pilot does not wish to let his airplane run at the take-off speed while waiting, he will readjust the mixture for idling. As he does so, he may then through this device uncheck that item on the list by pushing the button 25a for this item which permits the corresponding colored strip 20 to return to its vertical position and the typed item on the sheet 18 to appear on a white background. Then, when a couple of minutes later he gets word from the control tower to take off immediately, he glances at the list and finds that this feature is still unchecked, so he immediately sets back his mixture for the take-off. Without this checking means it might be perfectly possible for the pilot to attempt the take-off with his engine running on an idling mixture, resulting in a crash. However, if it were compulsory for pilots to use this device as a part of the take-off procedure, for example, many crashes of this type would be eliminated.

It is to be understood, however, that this device is not limited to use for aircraft, but may be used in buildings, or factories or other places, where, for example, an employee has an established list of duties to perform at a certain time. It can be used in various transportation machines, such as airplanes, boats, trains, buses, trucks, cars and so forth, and any other machine or plant, for the purpose of using the correct order in starting, running and stopping such machines. It can also be used in buildings for similar utility, to show when the factory, apartment or house is ready for use (e. g., heat, power, and water turned on) and in closing up such buildings, such items as utilities turned off, windows closed, etc. It can be used in hotels and apartments to show such items, for example, as completion of janitorial, kitchen workers' and other help's duties. Similarly in homes to show order or completion of cooks' maids' and gardners' duties; for completion of children's chores, such as brushing teeth, chopping wood, putting out cat at night, and so forth.

For convenience's sake, the colored strips 20 may be placed so that they will cover information written on a standard typewriter by placing the colored strips so that they are one, two or three spaces apart. Thus, for example, take the type of device shown in Fig. 1, where the colored strips 20 are triple-spaced; the list 18 may merely be inserted in the standard typewriter and the information itemized on the list triple-spaced. In this manner, each item may be checked off by a corresponding colored strip. If it is desirous of using more items, the device in the form shown in Figs. 4 and 7 may be used, where the buttons are tiered so that more buttons may be provided. In this instance, the items in the list 18 may be double or single spaced as the colored strips 20 are placed a corresponding distance from each other.

Having thus set forth the nature of my invention, I claim:

1. A checking device of the character described comprising a support adapted to hold a light transmitting sheet on which various items are marked, means for illuminating said sheet, a colored light transmitting strip associated with each item, a shaft mounting each strip so that it may be swung to and from positions over and away from its item to impart contrasting appearances thereto, and manually operable means controlling the position of each strip including a slidable rod provided with means for shifting said rod in opposite directions to control the position of the strip.

2. A checking device of the character described comprising means for supporting a paper sheet on which various items are typed, means for illuminating the sheet, a colored strip associated with each item, means for pivotally mounting each strip so that it may swing to and from a position over its associated item to impart contrasting appearances thereto, a slidable rod associated with each strip, a cam on each rod for shifting the strip, and manual means for shifting each rod.

3. A checking device of the character described comprising means for supporting a paper sheet on which various items are typed, means for illuminating the sheet, a colored strip associated with each item, means pivotally mounting each strip so that it may swing to and from a position over its associated item to impart contrasting appearances thereto, a spring tending to swing each strip away from its item, a slidable rod adjacent each strip, a cam on the rod for shifting the adjacent strip to a position over its item, manual means for shifting each rod in opposite directions, and spring means for holding each rod in its different positions.

4. A checking device of the character described comprising a box, a translucent plate covering one side of the box and adapted to support a paper sheet on which various items are typed, a glass cover over the sheet to retain it on the plate, means in the box for illuminating the sheet from the inner side, a colored translucent strip associated with the location for each item, means pivotally mounting each strip to swing to and from a position over its associated item to give it contrasting appearances, a spring tending to swing each strip in one direction, a sliding rod for each strip, a cam operated by each rod to swing the associated strip in the opposite direction, and manual means for shifting each rod in opposite directions.

5. A checking device of the character described comprising a box, a translucent plate covering one side of the box and adapted to support a paper sheet on which various items are typed, a glass cover over the sheet to retain it on the plate, means in the box for illuminating the sheet from the inner side, a colored translucent strip associated with the location for each item, means pivotally mounting each strip to swing to and from a position over its associated item to give it contrasting appearances, a spring tending to swing each strip in one direction, a sliding rod for each strip, a cam on each rod adapted to engage the associated strip to swing it in the opposite direction, said rods being guided in the side of the box and arranged with adjacent rods at different distances from the cover, and manual means for shifting each rod in opposite directions.

6. A checking device of the character described comprising a box, means for supporting a light transmitting sheet on which various items are marked over one side of the box, means for illuminating said sheet, a colored light transmitting strip associated with each item, means pivotally mounting each strip to swing to and from a position over its associated item to give it contrasting appearances, a slidable rod associated with each strip, said rods being slidable in sides of the box and arranged with adjacent rods spaced different distances from the sheet, means operated by each rod for controlling the positions of the associated strip, and manual means for shifting each rod in opposite directions to control its associated strip.

WILLIAM H. GRACE.

REFERENCES CITED

The following references are of record in the file of this patent:

UNITED STATES PATENTS

| Number | Name | Date |
|---|---|---|
| 1,605,429 | Fisher | Nov. 2, 1926 |
| 1,616,687 | Gerner | Feb. 8, 1927 |
| 2,292,069 | Gruver | Aug. 4, 1942 |
| 2,324,934 | June | July 20, 1943 |